United States Patent [19]

Kanome et al.

[11] Patent Number: 6,147,152
[45] Date of Patent: Nov. 14, 2000

[54] POLYPROPYLENE RESIN COMPOSITIONS AND INTERIOR AUTOMOTIVE TRIM PARTS

[75] Inventors: Yoshihiro Kanome; Takao Nomura, both of Toyota; Kouichi Hatada, Ichihara; Shinei Gima, Ichihara; Teruaki Hayashida, Ichihara; Osamu Kojima, Ichihara; Ken Shimizu, Ichihara; Hiroaki Hase, Ichihara, all of Japan

[73] Assignees: Toyota Jidosha Kabushiki Kaisha, Aichi-ken; Chisso Corporation, Osaka, both of Japan

[21] Appl. No.: 09/230,095
[22] PCT Filed: May 20, 1998
[86] PCT No.: PCT/JP98/02214
  § 371 Date: May 4, 1999
  § 102(e) Date: May 4, 1999
[87] PCT Pub. No.: WO98/54258
  PCT Pub. Date: Dec. 3, 1998

[30] Foreign Application Priority Data

May 26, 1997 [JP] Japan ..................... 9-135261

[51] Int. Cl.[7] .................. C08J 3/00; C08K 3/34; C08L 51/00; C08G 63/48; C08G 63/91
[52] U.S. Cl. .................. 524/451; 524/505; 525/70; 525/88; 525/89; 525/90; 525/92 R; 525/92 A; 525/95; 525/98
[58] Field of Search .................. 524/451, 505; 525/70, 88, 89, 90, 92 R, 92 A, 95, 98

[56] References Cited

U.S. PATENT DOCUMENTS 5,750,612  5/1998  Zyagawa et al. ........ 524/451
5,883,174  3/1999  Akagawa et al. ........ 524/451

FOREIGN PATENT DOCUMENTS

| | | |
|---|---|---|
| 0 509 662 | 10/1992 | European Pat. Off. . |
| 0 683 206 | 11/1995 | European Pat. Off. . |
| 59-37294 | 9/1984 | Japan . |
| 62-187707 | 8/1987 | Japan . |
| 62-45883 | 9/1987 | Japan . |
| 1-168743 | 7/1989 | Japan . |
| 1-168744 | 7/1989 | Japan . |
| 4-342752 | 11/1992 | Japan . |
| 5-132606 | 5/1993 | Japan . |
| 7-048485 | 2/1995 | Japan . |

OTHER PUBLICATIONS

"Temperature rising elution fractionation of linear polyolefins" J.P.B. Soares et al., Polymer, vol. 36, No. 8, 1995, pp. 1639–1654.

Primary Examiner—Patrick D. Niland
Attorney, Agent, or Firm—McDermott, Will & Emery

[57] ABSTRACT

A polypropylene resin composition is diclosed which comprises (a) 50–80% by weight of a specific polypropylene/ethylene-propylene copolymer composition, (b) 5–40% by weight of a specific ethylene/α-olefin copolymer rubber, (c) 1–10% by weight of a specific hydrogenated diene block copolymer, and (d) 10–30% by weight of talc, wherein the polypropylene component of the component (a) has a melt flow rate of 100–1,000 g/10 min and a $C_f$ value (cross fractionation ratio) of not more than 0.5. The resin composition has excellent flowability and can impart excellent rigidity, high-temperature rigidity and impact resistance, and well-balanced combination thereof to the molded articles.

8 Claims, No Drawings

POLYPROPYLENE RESIN COMPOSITIONS AND INTERIOR AUTOMOTIVE TRIM PARTS

FIELD OF THE INVENTION

This invention relates to polypropylene resin compositions and more particularly, to the resin compositions havig a well-balanced combination of flowability, rigidity, high-temperature rigidity and impact resistance, which are suitable for the molding of interior automotive trim parts. The invention also relates to interior automotive trim parts molded from said resin compositions.

BACKGROUND OF THE INVENTION

Polypropylene resins have been extensively used in automotive applications and in fields such as electrical appliances, miscellaneous goods, films or the like, because the articles molded therefrom are excellent in rigidity and high-temperature rigidity. The resin compositions for interior automotive trim parts have been required to be excellent in not only rigidity and high-temperature rigidity, but also impact resistance of molded articles and flowability of the resin compositions on molding. However, conventional polypropylene resins have been limited in the use range, since the articles molded therefrom are deficient in impact resistance.

As typical polypropylene resins having improved impact resistance are known propylene/ethylene block copolymers wherein propylene and ethylene are block copolymerized and polypropylene resin compositions wherein polypropylene is incorporated with an ethylene/α-olefin copolymer rubber. Such polypropylene resins have lower rigidity than a propylene homopolymer. If those resins are incorporated with inorganic fillers such as talc, as the occasion demands, to make up for lowered rigidity, they are used mainly as molding materials for exterior automotive trim parts including automotive bumpers and interior automotive trim parts including instrument panels, console boxes, resin pillars and trims. However, the incorporation of inorganic fillers in a large amount is required to enhance the rigidity of the resin composition, which results in lowering the flowability of the resultant composition and also in increasing the specific gravity of the resultant molded articles, with an increased weight of the products.

With a view to improving the impact resistance and stress-whitening resistance of α-olefin polymers such as polypropylene and polyethylene and α-olefin copolymers such as ethylene/propylene copolymer, various resin compositions have been proposed wherein hydrogenated diene copolymers are incorporated therein.

For example, JP-B-59-37294 discloses a resin composition wherein a hydrogenated 1,2-polybutadiene is incorporated in polymers or copolymers of α-olefin with 2 to 20 carbons, especially ethylene homopolyhmer, propylene homopolymer or ethylene/propylene copolymer. JP-B-62-45883 and JP-A-4-342752 disclose a resin composition wherein a hydrogenated diblock copolymer of polybutadienes consisting of 1,2-block and 1,4-block is incorporated in α-olefin polymers or copolymers, in particular polypropylene.

JP-A-5-132606 discloses a resin composition wherein a hydrogenated product of polybutadiene/conjugated diene block copolymers is incorporated in a crystalline propylene/ethylene block copolymer. JP-A-1-168743 and JP-A-1-168744 disclose a resin composition wherein a hydrogenated product of isoprene/butadiene copolymers is incorporated in polyolefins.

The resin compositions are improved in both stress-whitening resistance and impact resistance, but remarkably lowered in rigidity and high-temperature rigidity. Thus a practical use of such resin compositions is limited to the field of soft materials.

To enhance the reduced rigidity and high-temperature rigidity in the above-described resin compositions wherein the hydrogenated diene block copolymers are incorporated in the propylene/ethylene block copolymers, it is created that the rigidity and high-temperature rigidity of the molded articles are improved with no increase in the specific gravity, by substitution for said propylene/ethylene block copolymers of high stereoregular polypropylenes disclosed in JP-A-62-187707. However, a reduction in impact resistance of the molded articles is anticipated. As mentioned above, the impact resistane of the polypropylene resin comositions is improved by the incorporation of the ethylene/α-olefin copolymer rubber and the hydrogenated polybutadiene polymer and copolymer. However, the incorporation of these rubber components in a large amount brings about new issue of lowering the rigidity and high-temperature rigidity of the molded articles as well as the flowability of the resin compositions. Thus, it has been desired to develop a polypropylene resin composition being capable of improving the impact resistance of the molded articles with no reduction in the rigidity and high-temperature rigidity of the molded articles as well as the flowability of the resin compositions.

Accordingly, an object of the present invention is to provide a polypropylene resin composition having a well-balanced combination of the flowability of the resin composition and the rigidity, high-temperature rigidity and impact resistance of the molded article, which is suitable as a molding material for interior automotive trim parts.

SUMMARY OF THE INVENTION

The above-mentioned object of the invention can be attained by incorporation of a specific hydrogenated diene block copolymer into a composition comprising a specific high tough polypropylene/ethylene-propylene copolymer composition, a specific ethylene/α-olefin copolymer rubber and talc.

The present invention provides a polypropylene resin composition comprising (a) 50–80% by weight of a polypropylene/ethylene-propylene copolymer composition,
(b) 5–40% by weight of an ethylene/α-olefin copolymer rubber,
(c) 1–10% by weight of a hydrogenated diene block copolymer, and
(d) 10–30% by weight of talc, each % by weight being based on the total weight of the resin composition, wherein the polypropylene/ethylene-propylene copolymer composition (a) has a melt flow rate of 10–300 g/10 min and comprises 60–95% by weight of a polypropylene component and 5–40% by weight of an ethylene/propylene copolymer component, the polypropylene component has a melt flow rate of 100–1,000 g/10 min and a $C_f$ value of not more than 0.5 and the ethylene/propylene copolymer component has an ethylene content of 30–80% by weight; the ethylene/α-olefin copolymer rubber (b) is a copolymer of ethylene and an α-olefin of 4 or more carbons, has an ethylene content of 25–90% by weight and contains a polyethylene crystal having a long period of 6–14 nm as determined by a small angle X-ray scattering; and the hydrogenated diene block copolymer (c) is a A—B or A—B—A block copolymer wherein a A segment is a 1,4-polybutadiene block and a B segment is a 1,2-polybutadiene block, a polyisoprene block or a butadiene/isoprene copolymer block, and wherein not less than 85% of the unsaturated bonds are hydrogenated.

The present invention also provides an interior automotive trim part which is molded from the above resin composition having a melt flow rate of not less than 25 g/10 min and has the mechanical properties such as a flexural modulus at room temperature of not less than 2,400 Mpa, a heat distortion temperature of not lower than 73° C. and an Izod impact strength at room temperature of not less than 300 J/m.

DETAILED DESCRIPTION OF THE INVENTION

The polypropylene resin composition of the invention comprises:
(a) 50–80% by weight of a polypropylene/ethylene-propylene copolymer composition,
(b) 5–40% by weight of an ethylene/α-olefin copolymer rubber,
(c) 1–10% by weight of a hydrogenated diene block copolymer, and
(d) 10–30% by weight of talc, and has a melt flow rate of not less than 25 g/10 min, and further comprises
(e) a desired additive.

The molded articles from the above resin compositions satisfy various properties such as a flexural modulus at room temperature of not less than 2,400 Mpa, a heat distortion temperature of not lower than 73° C. (1820 kPa load) and an Izod impact strength at room temperature of not less than 300 J/m, required for interior automotive trim parts.

Each component constituting the polypropylene resin composition of the present invention is fully described below.

(a) Polypropylene/ethylene-propylene Copolymer Composition

The copolymer composition (a) is a principal component of the present resin composition and comprises 60 to 95% by weight of the polypropylene component and 40 to 5% by weight of the ethylene/propylene copolymer component.

The polypropylene component is a high stereoregular propylene homopolymer which has a melt flow rate (MFRpp) of 100–1000 g/10 min, preferably 100–500 g/10 min as determined at 230° C. under a load of 2.16 kg according to ASTM D 1238 and which has a narrow molecular weight distribution wherein a cross fractionation ratio ($C_f$ value) on the basis of an elution temperature at 112° C. in the fractionation of polypropylene with o-dichlorobenzene is not more than 0.5. The fractionation of polypropylene was carried out in accordance with the method reported by J. B. P. Soares et al in "POLYMER" vol. 36, No. 8, pp 1639–1654(1995). The cross fractionation ratio ($C_f$ value) was determined in the following manner. More specifically, a fractionation column was prepared in which a stainless tube (15 cm length, 0.46 cm I/D) was packed with glass beads (each 0.1 mm diameter). 0.5 ml of a solution of polypropylene in o-dichlorobenzene at 140° C. (concentration: 2 mg/ml) was introduced into the fractionation column kept at 140° C. The temperature of the fractionation column was cooled down from 140° C. to 0° C. at the rate of 1° C./min to precipitate polypropylene on the surface of glass beads. While maintaining the fractionation column at 0° C., o-dichlorobenzene at 0° C. was continuously introduced for 2 minutes into the fractionation column at a rate of 1 ml/min, by which a polymer fraction soluble in o-dichlorobenzene was eluted and determined for the amount and molecular weight of the eluted polymer. This operation was repeated by gradiently increasing the elution temperatures by 10° C. intervals in the range of 0–50° C., by 5° C. intervals in the range of 50–90° C. and by 3° C. intervals in the range of 90–140° C. Then, the amount of the polymer eluted in each temperature, the weight fraction and molecular weight of each fraction were determined. From the determined results, there were obtained an integrated value ($C_{fl}$) of the polymer fractions eluted at an elution temperature of less than 112° C. and an integrated value ($C_{fh}$) of the polymer fractions eluted at an elution temperature of not less than 112° C., and the cross fractionation ratio ($C_f$) was expressed as a ratio of $C_{fl}$ to $C_{fh}$ ($C_{fl}/C_{fh}$).

In the practice of the present invention, the $C_f$ value was determined by a cross fractionation device (CFC T-150A) manufactured by Mitsubishi Chemical Co. Ltd. using a column (SHODEX AD-806 M/S) manufactured by Showa Denko Co. Ltd. under the determining conditions as mentioned above.

The melt flow rate ($MFR_{pp}$) of the polypropylene component has an effect on the flowability of the resin composition and the toughness of the molded article. If it is too low, the melt flow characteristics of the resin composition lower, thus resulting in poor moldability. If it is too high, the toughness of the molded article lowers.

The $C_f$ value is an index of a stereoregularity and molecular weight distribution. Lower $C_f$ value will provide higher stereoregularity and narrower molecular weight distribution, which results in an increased toughness of the molded article.

The ethylene/propylene copolymer component is a random copolymer of ethylene and propylene and contains 30–80% by weight, preferably 35–55% by weight of an ethylene unit on the copolymer basis. The ethylene content in the copolymer component has an effect on the rigidity and impact resistance of the molded article. If it is too high, the rigidity lowers. If it is too low, the impact resistance lowers.

The ethylene content is determined by the infrared spectrometry of the ethylene/propylene copolymer using a culibration curve prepared from the standard samples of ethylene/propylene copolymers produced with varied reaction ratios.

The polypropylene/ethylene-propylene copolymer composition (a) is adjusted to provide the melt flow rate ($MFR_a$) in the range of 10 to 300 g/10 min, preferably 20 to 150 g/10 min. If $MFR_a$ is too low, the moldability, i.e. flowability of the resin composition on injection molding to the molded article, e.g. interior automotive trim parts becomes unsatisfactory. If it is too high, the impact resistance of the molded article lowers. The range of $MFR_a$ to provide a well-balanced combination of moldability and impact resistance is from 55 to 110 g/10 min.

The composition ratio of the polypropylene component and the ethylene/propylene copolymer component is varied depending on $MFR_{pp}$ of the polypropylene component and the ethylene content of the ethylene/propylene copolymer component, but 60 to 95% by weight of the polypropylene component and 40 to 5% by weight of the ethylene/propylene component.

In the resin composition of the present invention, the amount of the copolymer composition (a) incorporated is 50 to 80% by weight, preferably 55 to 70% by weight on the basis of the resin composition.

The copolymer composition (a) is a component for imparting the rigidity and high-temperature rigidity to the molded article. If the amount of the component incorporated is too little, the rigidity and high-temperature rigidity of the molded article lower. If it is too much, the impact resistance of the molded article lowers.

The copolymer composition (a) may be prepared by any method if it satisfies the above-mentioned requirements. It can be readily produced by a two-stage polymerization process wherein in the polymerization step (I) propylene is homopolymerized to produce a polypropylene having the above-mentioned properties and in the polymerization step (II) ethylene and propylene are copolymerized in the presence of the polypropylene produced in the polymerization step (I) to produce an ethylene/propylene copolymer.

The homopolymerization of propylene and the copolymerization of propylene and ethylene may be conducted in a continous or batch process. In this case, there can be used a slurry polymerization carried out in a hydrocarbon solvent such as n-hexane, n-heptane, n-octane, benzene, toluene, a bulk polymerization carried out in a liquefied propylene and a gas phase polymerization. When the slurry polymerization is used in the polymerization step (I), the polymerization is performed at a temperature of 20 to 90° C., preferably 50 to 80° C. and a pressure of 0 to 5 MPa. For the gas phase polymerization, the polymerization is performed at a temperature of 20 to 150° C. and a pressure of 0.2 to 5 MPa. In the polymerization step (II), the polymerization is performed at a temperature of 20 to 80° C., preferably 40 to 70° C. and a pressure of 0 to 5 MPa.

In the homopolymerization of propylene and the copolymerization of ethylene and propylene, hydrogen can be used to control the molecular weight. In the polymerization step (I), a hydrogen concentration is controlled to a higher level to prepare a polymer of high $MFR_{PP}$. In the polymerization step (II), a hydrogen concentration is controlled to a very low level or a non-hydrogen state to prepare a copolymer of a low $MFR_{EP}$.

(b) Ethylene/α-olefin Copolymer Rubber

The ethylene/α-olefin copolymer rubber (b) has an ethylene content of 25 to 90% by weight and is a copolymer rubber wherein ethylene and an α-olefin of 4 or more carbon atoms are copolymerized, which imparts the elasticity, especially elongation to the molded article.

The copolymer rubber also exhibits a long period in the range of 6 to 14 nm, preferably 8 to 12 nm and its ethylene component is present as a polyethylene crystal, the long period being determined for the sheet by a small-angle X-ray scattering under the conditions: a radiation source Cu—Kα ray; a step angle 0.02°; and a scanning range −4° to +4°, using a X-ray diffractometer (JEOL 8200T) manufactured by Japan Electron Co. Ltd.

The long period of the copolymer rubber (b) expresses the crystallizability of polyethylene in the copolymer rubber. The polyethylene crystal in the copolymer rubber acts as a quasi crosslinked substance to enhance the rubber. If the long period is too low, namely the polyethylene crystal is too small or the crystallizability is insufficient, the action as a quasi crosslinked substance becomes insufficient. If the long period is too high, namely the polyethylene crystal is too large, the copolymer rubber is easy to separate from the polypropylene resin, which is responsible for reduction in tensile elongation of the article molded from the resin composition comprising such copolymer rubber.

The ethylene/α-olefin copolymer rubbers are not limited in respect of the molecular weight, but it is preferable to use those having a melt index (MI)(according to ASTM D 1238) of 0.1 to 30 g/10 min as determined at 190° C. under a load of 2.16 kg. The ethylene content in the ethylene/α-olefin copolymer rubber is preferably 45 to 90% by weight, more preferably 50 to 80% by weight.

Preferred ethylene/α-olefin copolymer rubber is a copolymer rubber wherein ethylene and an α-olefin of 4 or more carbons are copolymerized, for example a copolymer rubber constituted by two components such as ethylene/1-butene copolymer rubber, ethylene/1-hexene copolymer rubber, ethylene/1-octene copolymer rubber or the like, a copolymer rubber constituted by three components such as ethylene/1-butene/1-hexene copolymer rubber or the like and a mixture thereof.

The amount of the ethylene/α-olefin copolymer rubber incorporated is 5 to 40% by weight, preferably 10 to 30% by weight on the basis of the resin composition. The ethylene/α-olefin copolymer rubber has an effect on the impact resistance of the molded article. If the amount is too little, the improved effect of the impact resistance is unsatisfactory. If it is too much, the rigidity and high-temperature rigidity lower, possibly with impairing the flowability of the resin composition.

The ethylene/α-olefin copolymer rubber can be produced for example by a polymerization process as disclosed in JP-A-6-306121 wherein ethylene is continuously brought into contact with one or more substantially linear olefin polymers or α-olefins of 4–20 carbons under the polymerization condition in the presence of a catalyst composition comprising a 3–10 group metal in the periodic table or a lanthanide metal, a metal coordination complex and an activation co-catalyst.

(c) Hydrogenated Diene Block Copolymer

The hydrogenated diene block copolymer is a diene block copolymer wherein not less than 85%, preferably 90% or more of the unsaturated bonds are hydrogenated. This diene block copolymer is a A—B or A—B—A block copolymer wherein the A segment is a 1,4-polybutadiene block and the B segment is a 1,2-polybutadiene block, a polyisoprene block or a butadiene/isoprene copolymer block. The hydrogenated 1,4-polybutadiene block constituting the A segment has a maximum melting temperature peak as determined by a differential scanning calorimeter in the range of 80 to 120° C.

The hydrogenated diene block copolymer acts as a compatibilizing agent for enhancing the compatibility between the polypropylene/ethylene-propylene copolymer composition (a) and the ethylene/α-olefin copolymer rubber (b), thereby to finely disperse the copolymer rubber particles in the copolymer composition (a), thus improving the impact resistance of the molded article.

The melting temperature of the hydrogenated 1,4-polybutadiene block is an index of the crystallizability. If the melting temperature is too low, namely the crystallizability is low, the compatibility with the ethylene/α-olefin copolymer rubber becomes unsatisfactory.

The hydrogenated 1,2-polybutadiene and/or polyisoprene block constituting the B segment of the hydrogenated diene block copolymer has a compatibility with the copolymer composition (a).

The hydrogenated diene block copolymers can include, e.g. a hydrogenated product of a diblock copolymer comprising a 1,4-polybutadiene and a 1,2-polybutadiene, or the like, as disclosed in JP-B-62-45883; a hydrogenated product of a diblock or triblock copolymer comprising a 1,4-polybutadiene and a 1,2-polybutadiene or a 1,4-polybutadiene and a polyisoprene, or the like, a hydrogenated product of a triblock copolymer comprising a 1,4-polybutadiene, a 1,2-polybutadiene and a polystyrene, or a 1,4-polybutadiene, a 1,2-polyisoprene and a polystyrene, or the like, as disclosed in JP-A-4-342752; a hydrogenated product of an isoprene/butadiene copolymer, or the like, as disclosed in JP-A-1-168743; and a hydrogenated product of an isoprene-butadiene//isoprene block copolymer, a hydrogenated product of a butadiene-isoprene//butadiene block copolymer and a hydrogenated product of an isoprene-butadiene block copolymer, or the like, as disclosed in JP-A-1-168744. It is more preferable as a compatibilizing agent that the hydrogenated diene block copolymer is linear.

The amount of the hydrogenated diene block copolymer incorporated is 1 to 10% by weight, preferably 2 to 5% by weight on the basis of the resin composition. If the amount is too little, an effect of dispersing the ethylene/α-olefin copolymer rubber (b) in the copolymer composition (a) as a compatibilizing agent becomes weak, so that a phase separation by heat on molding cannot be prevented. If it is too much, the resin composition is plasticized and softened, thereby lowering the rigidity and high-temperature rigidity of the molded article.

(d) Talc

The talc is finely divided talc particles having an average particle size of not more than 2 μm and in which the content of particles having a size of 4 μm or more is not more than 4% by weight, and is incorporated as a component for imparting the rigidity to the molded article. If the average particle size of the talc is too large and the content of particles having a size of 4 μm or more is too much, the impact resistance, particularly surface impact resistance of the final molded article lowers. The particle size of the talc is measured by Shimazu laser diffraction profile measuring device (SALD-2000) manufactured by Shimazu Manufacturing Co. Ltd., Japan.

The amount of the talc incorporated is 10 to 30% by weight, preferably 15 to 25% by weight on the basis of the resin composition.

It is important that the amount of the talc incorporated is as a required minimum level as possible, because talc gives adverse effects such as impairing the flowability of the resin composition, increasing the specific gravity of the product, eventually increasing the product weight and producing a flow mark on the surface of the molded article. If the amount is too little, the rigidity and high-temperature rigidity of the molded article lower, thus making it difficult to maintain the flexural modulus and heat distortion temperature required as the basic properties of interior automotive trim parts. If it is too much, the tensile elongation at break and impact resistance of the molded article tend to lower and a flow mark is easy to produce on the surface of the molded article.

(e) Other Components

If desired and necessary, various additives can be incorporated into the resin composition of the present invention, so long as the effects of the invention are not adversely influenced by such additives. Those additives can include antioxidants, antistatic agents, colorants (pigments), nucleating agents, slip agents, release agents, flame retardants, ultraviolet absorbers, weathering agents, plasticizers and free-radical generators.

The resin composition of the present invention comprises the components (a) to (d) in the respective prescribed amounts and if desired, an additional component (e) in the prescribed amount.

The resin composition of the invention can be produced, for example, by the following method. First, the predetermined amounts of the components (a) to (d) are mixed with a stabilizer and a colorant as an additive of the component (e) by means of a ribbon blender, tumbling mixer, Henschel mixer (trade name), supermixer or the like. The resulting mixture is melt-kneaded with a roll mill, Banbury mixer, LaboPlastomill, single- or twin-screw extruder or the like at a melt temperature of 150 to 300° C., preferably 180 to 250° C. and then pelletized.

The resin composition of the invention can be subjected to the production of various moldings by any of various molding techniques including injection molding, injection press molding, extrusion, vacuum forming and pressure forming. Of these molding techniques, injection molding and injection press molding are preferably used for producing moldings from the composition.

The interior automotive trim parts of the present invention are the articles molded into the desired shape from the resin composition wherein the melt flow rate is controlled to not less than 25 g/10 min. These molded articles satisfy the basic performance required for the interior automotive trim parts such as flexural modulus at room temperature (according to ASTM D 790) of 2400 MPa or more, heat distortion temperature (1820 kPa load, according to ASTM D 648) of 73° C. or higher and Izod impact strength at room temperature (according to ASTM D 256) of 300 J/m or more.

EXAMPLE

The invention is further illustrated by the following examples and comparative examples.

1) Components of Resin Composition (a) Component a-1) Polypropylene/ethylene-propylene Copolymer Composition Polypropylene component

| | |
|---|---|
| $MFR_{pp}$ | 200 g/10 min |
| Cf value | 0.31 |
| Proportion | 90% by weight |

Ethylene/propylene copolymer component

| | |
|---|---|
| $MFR_{EP}$ | 0.0001 g/10 min |
| Ethylene content | 40% by weight |
| Proportion | 10% by weight |

Copolymer composition

| | |
|---|---|
| $MFR_a$ | 48 g/10 min | a-2) Polypropylene/ethylene-propylene Copolymer (for comparison)

Polypropylene component

| | |
|---|---|
| $MFR_{pp}$ | 200 g/10 min |
| Cf value | 0.60 |
| Proportion | 90% by weight |

Ethylene-propylene copolymer component

| | |
|---|---|
| $MFR_{EP}$ | 0.00008 g/10 min |
| Ethylene content | 45% by weight |
| Proportion | 10% by weight |

Copolymer composition

| | |
|---|---|
| MFR$_a$ | 46 g/10 min |

(b) Ethylene/α-Olefin Copolymer Rubber
b-1) Ethylene/1-octene Copolymer Rubber

| | |
|---|---|
| Ethylene content | 76.3% by weight |
| MI | 1.1 g/10 min |
| Long period | 8.6 nm | b-2) Ethylene/1-octene Copolymer Rubber

| | |
|---|---|
| Ethylene content | 76.2% by weight |
| MI | 4.3 g/10 min |
| Long period | 9.2 nm | b-3) Ethylene/1-octene Copolymer Rubber

| | |
|---|---|
| Ethylene content | 77.9% by weight |
| MI | 2.9 g/10 min |
| Long period | 9.3 nm | b-4) Ethylene/1-butene Copolymer Rubber

| | |
|---|---|
| Ethylene content | 90% by weight |
| MI | 2.1 g/10 min |
| Long period | 11.2 nm | b-5) Ethylene/1-butene Copolymer Rubber

| | |
|---|---|
| Ethylene content | 80% by weight |
| MI | 3.0 g/10 min |
| Long period | 10.2 nm | b-6) Ethylene/1-butene Copolymer Rubber

| | |
|---|---|
| Ethylene content | 85% by weight |
| MI | 3.6 g/10 min |
| Long period | 10.9 nm | b-7) Ethylene/1-hexene Copolymer Rubber

| | |
|---|---|
| Ethylene content | 85% by weight |
| MI | 1.3 g/10 min |
| Long period | 11.0 nm | b-8) Ethylene/1-hexene/1-butene Copolymer Rubber

| | |
|---|---|
| Ethylene content | 85% by weight |
| Hexene content | 14% by weight |

-continued

| | |
|---|---|
| MI | 3.5 g/10 min |
| Long period | 10.8 nm | b-9) Ethylene/propylene Copolymer Rubber (for comparison)

| | |
|---|---|
| Ethylene content | 78% by weight |
| MI | 0.4 g/10 min |
| Long period | 15.6 nm |
| Mooney viscosity ML1 + 4 (100° C.) | 60 |

(c) Hydrogenated Diene Block Copolymer
c-1) Hydrogenated(1,4-polybutadiene//1,2-polybutadiene/1,4-polybutadiene//1,4-polybutadiene)block Copolymer

| | |
|---|---|
| Structure | A-B-A type |
| % Hydrogenation | 95% |
| MFR (230° C., 2.16 kg load) | 1.4 g/10 min |
| Total A segment | 30% by weight |
| Melting temperature | 97° C. |
| B segment | 70% by weight | c-2) Hydrogenated(1,4-polybutadiene//1,2-polybutadiene/1,4-polybutadiene//1,4-polybutadiene)block Copolymer

| | |
|---|---|
| Structure | A-B-A type |
| % Hydrogenation | 95% |
| MFR (230° C., 2.16 kg load) | 0.4 g/10 min |
| Total A segment | 30% by weight |
| Melting temperature | 92° C. |
| B segment | 70% by weight | c-3) Hydrogenated(1,4-polybutadiene//1,4-polybutadiene/polyisoprene) block Copolymer

| | |
|---|---|
| Structure | A-B type |
| % Hydrogenation | 95% |
| MFR (230° C., 2.16 kg load) | 14 g/10 min |
| Total A segment | 30% by weight |
| Melting temperature | 92° C. |
| B segment | 70% by weight |

(d) Talc
d-1) Finely Divided Talc Particles

| | |
|---|---|
| Average particle size | 1.3 μm |
| Content of particles having a size of 4 μm or more | 2.5% by weight |

2) Method for the Measurement of Physical Properties

The physical properties of each component were measured by the following methods.

(a) Long Period of Ethylene/α-Olefin Copolymer Rubber

The pellets of the ethylene/α-olefin copolymer rubber were melt at 230° C. under 10 MPa for 5 minutes and cooled to 50° C. under 10 MPa to prepare a sheet having a thickness of 500 μm. The long period of the sheet was measured by a small-angle X-ray scattering using a X-ray diffractometer (JEOL 8200 T) manufactured by Japan Electron Co. Ltd.

under the following conditions: radiation ray Cu—Kα ray; step angle 0.02°; scanning range −4° to +4°.

(b) Melting Temperature of A Segment in the Hydrogenated Diene Block Copolymer 10 mg of a sample was introduced into a differential scanning calorimeter (1090 type DSC) manufactured by E. I. du Pont de Nemours & Co. First, the sample was heated to 230° C. at a rising rate of 30° C./min and kept at 230° C. for 10 minutes. Then, the sample was cooled to −60° C. at a decreasing rate of 20° C./min and kept at −60° C. for 10 minutes. The melting temperature was read from a peak of a thermogram obtained when the sample was again elevated at a rising rate of 20° C./min.

(c) Melt Flow Rate of Each Component

The pellets of the component to be measured were determined under the conditions of 230° C. and a load of 2.16 kg according to ASTM D 1238.

(d) Melt Index (MI) of Ethylene/α-Olefin Copolymer Rubber

The pellets of the ethylene/α-olefin copolymer rubber were determined under the conditions of 190° C. and a load of 2.16 kg according to ASTM D 1238.

3) Preparation of Resin Composition

Examples 1–10 and Comparative Examples 1–8

Each of the above-mentioned components was mixed in the respective proportions shown in Tables 1 and 2. The mixture was incorporated with a phenolic antioxidant as a stabilizer: 0.05 part by weight of tetrakis[methylene-3-(3,5-di-tert.butyl-4-hydroxyphenyl)propionate]methane, a phosphorus antioxidant: 0.05 part by weight of tetrakis(2,4-di-tert.butyl phenyl)-4,4-biphenylene-diphosphonite, a neutralizer: 0.1 part by weight of calcium stearate and a dispersant: 0.2 part by weight of zinc stearate. The resulting mixture was stirred and mixed with a Henschel mixer (trade name) for 3 minutes, melt-kneaded at 200° C. with a twin-screw extruder (PCM-45) manufactured by Ikegai Tekko Co., Ltd., Japan and pelletized to prepare the resin compositions of Examples 1–10 and Comparative Examples 1–8.

TABLE 1

| | Example No. | | | | | | | | | |
|---|---|---|---|---|---|---|---|---|---|---|
| | 1 | 2 | 3 | 4 | 5 | 6 | 7 | 8 | 9 | 10 |
| Composition | | | | | | | | | | |
| (a) Polypropylene/ethylene-propylene copolymer composition | | | | | | | | | | |
| Component No. | a-1 | a-1 | a-1 | a-1 | a-1 | a-1 | a-1 | a-1 | a-1 | a-1 |
| Proportion (wt %) | 64 | 62 | 65 | 60 | 61 | 60 | 60 | 60 | 62 | 65 |
| (b) Ethylene/α-olefin copolymer rubber | | | | | | | | | | |
| Component No. | b-1 | b-1 | b-3 | b-4 | b-5 | b-6 | b-8 | b-4 | b-1 | b-3 |
| Proportion (wt %) | 13 | 6.5 | 12 | 17 | 7.5 | 17 | 17 | 17 | 6.5 | 12 |
| Component No. | | b-2 | | | b-7 | | | | b-2 | |
| Proportion (wt %) | | 6.5 | | | 7.5 | | | | 6.5 | |
| (c) Hydrogenated diene block copolymer | | | | | | | | | | |
| Component No. | c-1 | c-1 | c-1 | c-1 | c-1 | c-1 | c-1 | c-2 | c-3 | c-3 |
| Proportion (wt %) | 3 | 5 | 3 | 3 | 4 | 3 | 3 | 3 | 5 | 3 |
| (d) Finely divided talc particles (wt %) | 20 | 20 | 20 | 20 | 20 | 20 | 20 | 20 | 20 | 20 |
| Physical Properties | | | | | | | | | | |
| (1) Melt flow rate (g/10 min) | 33 | 34 | 30 | 29 | 29 | 33 | 30 | 29 | 30 | 31 |
| (2) Flexural modulus (MPa) | 2510 | 2580 | 2530 | 2500 | 2480 | 2460 | 2470 | 2500 | 2470 | 2475 |
| (3) Heat distortion temperature (° C.) | 74 | 73 | 76 | 76 | 74 | 75 | 75 | 77 | 73 | 73 |
| (4) Tensile elongation at break (%) | >500 | >500 | >500 | >500 | >500 | >500 | >500 | >500 | >500 | >500 |
| (5) Izod impact strength (J/m) | 310 | 320 | 420 | 480 | 320 | 390 | 400 | 400 | 310 | 400 |

TABLE 2

| | Comparative Example No. | | | | | | | |
|---|---|---|---|---|---|---|---|---|
| | 1 | 2 | 3 | 4 | 5 | 6 | 7 | 8 |
| Composition | | | | | | | | |
| (a) Polypropylene/ethylene-propylene copolymer composition | | | | | | | | |
| Component No. | a-1 | a-1 | a-1 | a-1 | a-1 | a-1 | a-2 | a-1 |
| Proportion (wt %) | 64 | 62 | 65 | 62 | 62 | 44 | 65 | 63 |
| (b) Ethylene/α-olefin copolymer rubber | | | | | | | | |
| Component No. | b-1 | b-1 | b-3 | | | b-2 | b-2 | |
| Proportion (wt %) | 16 | 9 | 15 | | | 18 | 12 | |

TABLE 2-continued

|  | Comparative Example No. | | | | | | | |
| --- | --- | --- | --- | --- | --- | --- | --- | --- |
|  | 1 | 2 | 3 | 4 | 5 | 6 | 7 | 8 |
| Component No. |  | b-2 |  |  |  |  |  |  |
| Proportion (wt %) |  | 9 |  |  |  |  |  |  |
| (c) Hydrogenated diene block copolymer |  |  |  |  |  |  |  |  |
| Component No. |  |  |  | c-1 | c-3 | c-1 | c-1 | c-1 |
| Proportion (wt %) |  |  |  | 18 | 18 | 3 | 3 | 3 |
| (d) Finely divided talc particles (wt %) | 20 | 20 | 20 | 20 | 20 | 35 | 20 | 20 |
| Physical Properties |  |  |  |  |  |  |  |  |
| (1) Melt flow rate (g/10 min) | 32 | 32 | 33 | 22 | 29 | 23 | 25 | 30 |
| (2) Flexural modulus (MPa) | 2520 | 2500 | 2560 | 1700 | 1600 | 3300 | 3000 | 2400 |
| (3) Heat distortion temperature (° C.) | 74 | 73 | 76 | 58 | 57 | 75 | 82 | 73 |
| (4) Tensile elongation at break (%) | 160 | 150 | 180 | >500 | >500 | 30 | 100 | 80 |
| (5) Izod impact strength (J/m) | 130 | 120 | 170 | 580 | 600 | 40 | 150 | 180 |

4) Molding of Resin Composition

The pellets of each composition obtained in Examples 1–10 and Comparative Examples 1–8 were determined for MFR according to the method as mentioned above. From those pellets, test pieces having the given dimensions were molded by injection molding at a molding temperature of 210° C. and a mold temperature of 40° C., and then subjected to the evaluation tests. The results were shown in Tables 1 and 2.

5) Evaluation Test (a) Flexural Modulus (Three-point Flexural Modulus)

Test pieces having a length of 130 mm, a width of 13 mm and a thickness of 6.4 mm were used and measured for flexural modulus under the condition of 23° C. according to ASTM D 790 to evaluate the rigidity.

(b) Heat Distortion Temperature (° C.)

Test pieces having a length of 130 mm, a width of 13 mm and a thickness of 6.4 mm were used and measured for heat distortion temperature under the condition of 1820 kPa load according to ASTM D 648 to evaluate the high-temperature rigidity.

(c) Tensile Tests (MPa, %)

Test pieces having a length of 246 mm, a width of 19 mm and a thickness of 3.2 mm were used and measured for tensile strength at yield point and tensile elongation at break under the condition of 23° C. according to ASTM D 638.

(d) Izod Impact Strength (J/m)

Test pieces having a length of 63.5 mm, a width of 12.7 mm and a thickness of 6.4 mm were notched and measured for Izod impact strength at 23° C. according to ASTM D 256 to evaluate the impact resistance.

6) Evaluation Results

As apparent from Examples 1 to 8 shown in Table 1, the resin compositions of the present invention have excellent flowability and the articles molded from such resin compositions have excellent rigidity and impact resistance. These properties include MFR of 25 g/10 min or more for the resin compositions and flexural modulus at room temperature of 2400 MPa or more, heat distortion temperature of 73° C. or higher and Izot impact strength at room temperature of 300 J/m or more for the molded articles, satisfying the basic characteristics required for interior automotive trim parts.

In contrast, the resin compositions of Comparative Examples 1 to 3 not containing the hydrogenated diene block copolymer have a poor balance between the rigidity and impact resistance, especially poor impact resistance, and also have a reduced tensile elongation at break. The resin compositions of Comparative Examples 4 and 5 containing more than 10% by weight of the hydrogenated diene block copolymer exhibit an improved impact resistance, but remarkably low rigidity and high-temperature rigidity.

The resin composition of Comparative Example 6 containing more than 30% by weight of talc demonstrates a lowered flowability and a lowered tensile elongation at break due to an addition of talc in a large quantity.

The resin composition of Comparative Example 7 wherein conventional propylene block copolymer (a-2) was incorporated in place of the polypropylene/ethylene-propylene copolymer composition (a-1) exhibits a remarkably low toughness in terms of impact resistance and tensile elongation at break.

The resin composition of Comparative Example 8 using the ethylene/α-olefin copolymer rubber having the long period of 14 nm or more exhibits a remarkably low impact resistance and tensile elongation at break.

EFFECT OF THE INVENTION

By incorporating a specific amount of talc into a resin component comprising a specific high tough polypropylene/ethylene-propylene copolymer composition, a specific ethylene/α-olefin copolymer rubber and a specific hydrogenated diene block copolymer, the polypropylene resin compositions of the present invention exhibit excellent flowability, and also the articles molded therefrom are superior in high-temperature rigidity and impact resistance to those molded from conventional polypropylene resin compositions. Accordingly, the use of the present resin compositions as a molding material can make interior automotive trim parts large-sized, thin-walled, light-weight and low cost.

What is claimed is:

1. A polypropylene resin composition comprising
   (a) 50–80% by weight of a mixture of polypropylene and an ethylene-propylene copolymer,
   (b) 5–40% by weight of an ethylene/α-olefin copolymer rubber,
   (c) 1–10% by weight of a hydrogenated diene block copolymer, and
   (d) 10–30% by weight of talc,
   each % by weight being based on the total weight of the resin composition, wherein the mixture of polypropylene and ethylene-propylene copolymer (a) has a melt flow rate of 10–300 g/10 min under the conditions of a temperature of 230° C. and a load of 2.16 kg and comprises 60–95% by weight of a polypropylene component and 5–40% by weight of an ethylene/propylene copolymer component, the polypropylene component has a melt flow rate of 100–1,000 g/10 min under the conditions of a temperature of 230° C. and a load of 2.16 kg and a $C_f$ value of not more than 0.5 and the ethylene-propylene copolymer component has an ethylene content of 30–80% by weight; the ethylene/α-olefin copolymer rubber (b) is a copolymer of ethylene and an α-olefin of 4 or more carbons, has an ethylene content of 25–90% by weight and contains a polyethylene crystal having a long period of 6–14 nm as determined by a small angle X-ray scattering; and the hydrogenated diene block copolymer (c) is a A—B or A—B—A block copolymer wherein a A segment is 1,4-polybutadiene block and a B segment is a 1,2-polybutadiene block, a polyisoprene block or a butadiene/isoprene copolymer block, and wherein not less than 85% of the unsaturated bonds are hydrogenated.

2. The resin composition of claim 1 wherein the ethylene/α-olefin copolymer rubber has a long period of 8–12 nm as determined by a small angle X-ray scattering.

3. The resin composition of claim 1 wherein the ethylene/α-olefin copolymer rubber is a copolymer rubber constituted by two components, selected from the group consisting of ethylene/1-butene copolymer rubber, ehtylene/1-hexene copolymer rubber and ethylene/1-octene copolymer rubber, a copolymer rubber constituted by three components comprising ethylene, 1-butene, and 1-hexene or a mixture thereof.

4. The resin composition of claim 1 wherein the hydrogenated 1,4-polybutadiene block constituting the hydrogenated diene block copolymer has a melting temperature of 80 to 120° C. as determined by a differential scanning calorimeter.

5. The resin composition of claim 1 wherein talc is finely divided talc particles having an average particle size of not more than 2 μm and the content of the particles of not less than 4 μm is not more than 4% by weight.

6. The resin composition of claim 1 further comprising a desired additive.

7. The resin composition of claim 6 wherein the additives are antioxidants, antistatic agents, colorants (pigments), nucleating agents, slip agents, release agents, flame retardants, ultraviolet absorbers, weathering agents, plasticizers and free-radical generators.

8. An interior automotive trim part which is molded from the resin composition of claim 1 having a melt flow rate of not less than 25 g/10 min and which has a flexural modulus at room temperature of not less than 2,400 Mpa, a heat distortion temperature of not lower than 73° C. and an Izod impact strength at room temperature of not less than 300 J/m.

* * * * *